INVENTOR
Joseph H. Nash
BY D. H. Halstead
ATTORNEY

May 23, 1933. J. H. NASH 1,910,810
ACOUSTICAL CONSTRUCTION FOR INTERIORS
Original Filed Oct. 12, 1928  2 Sheets-Sheet 2

INVENTOR
BY Joseph H. Nash.
D. N. Halstead ATTORNEY

Patented May 23, 1933

1,910,810

UNITED STATES PATENT OFFICE

JOSEPH H. NASH, OF NARBERTH, PENNSYLVANIA, ASSIGNOR TO JOHNS-MANVILLE CORPORATION, OF NEW YORK, N. Y., A CORPORATION OF NEW YORK

ACOUSTICAL CONSTRUCTION FOR INTERIORS

Application filed October 12, 1928, Serial No. 312,082. Renewed April 6, 1932.

The present invention relates to sound-absorbing and sound-dissipating constructions and materials adapted for use as an interior finish in buildings, rooms and enclosures, and more particularly for correcting acoustical difficulties arising from excessive sound reflections and reverberations.

One of the primary purposes of this invention is to form or provide the interior surface walls of buildings with spaced block-like formations of suitable texture, thickness, size and shape, arranged in suitable patterns for the purpose of correcting acoustical difficulties.

An object of this invention is to make a sound-absorbing material or construction which, without injuring or affecting its sound-dissipating capacity, can at a relatively low cost be easily and readily applied to any desired structure.

Another object of this invention is to produce a sound-absorbing and dissipating assembly or unit which is not only durable and adaptable, but one which can be coated and easily decorated in any desired manner, and which may be manipulated and constructed in various configurations that are not only pleasing in appearance, but best adapted to have a maximum mutilating and absorbing capacity for different pitches and kinds of sounds.

A still further purpose of this invention is to provide a prebuilt construction consisting of an assembly of units of like or different materials having different degrees of flexibility, texture, surface friction and porosity, combined in such a manner as to secure the desired degree of dissipation, absorption and modulation of sound waves of various frequencies suitable for the occasion.

A further object of this invention is to provide a prebuilt construction consisting of layers and units in which the thickness, the size, the shape thereof, the arrangement and the distance between the units may be varied so that the complete assembly will possess any reasonable sound-dissipating and mutilating capacity that may be desired.

The above and various other objects and advantages of this invention will be described and understood from the following detailed description of the present preferred embodiments, the same being illustrated in the accompanying drawings, wherein.

Figure 1:
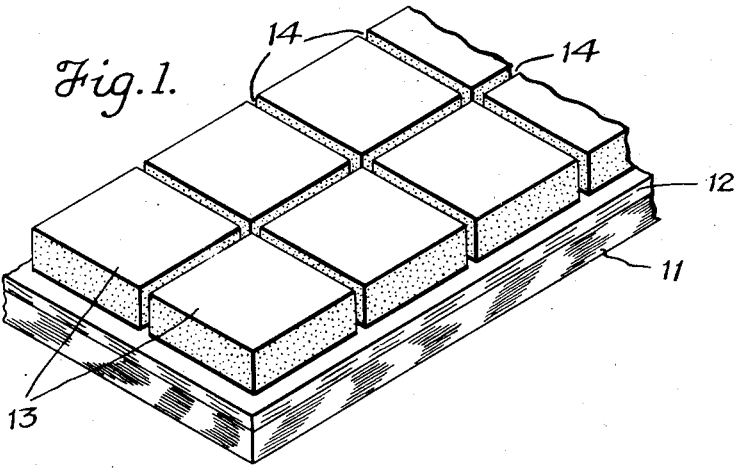
Fig. 1 is a fragmentary detailed perspective view of a prebuilt sound-absorbing and dissipating unit constructed in accordance with this invention.

The nature and importance of this invention will be better understood by giving a brief description of the various factors that have been considered with reference to developing an acoustical combination or structure which is effective for absorbing, dissipating and modulating sound waves.

Sound may be said to be a form of wave energy in an elastic medium, and anything which absorbs or dissipates the energy thereof will tend to destroy and deaden the sound. Sound waves in the air which are not absorbed or dissipated by a body are reflected, causing reverberations.

The amount of absorption or dissipation that takes place when a sound wave strikes the surface of a body depends upon the characteristics it may have with regard to porosity, surface roughness or fricion and flexibility both as a mass and the undivided parts thereof. All the above factors are very important, and it has been found that by combining and varying the relative ratios and associations of the above characteristics, acoustical structures can be made which have a wide range of sound absorption or dissipation.

Sound absorption and dissipation by means of porosity, friction and flexibility are widely recognized; however, very little is known of the sound dissipation that can be effected by destroying the regular periodicity of vibrations by mutilations of the sound waves. It has been found by laboratory test that a block formation with intermediate spacings or channels over the surface of a body or wall has a very pronounced breaking-up action of the sound waves, and it has been further proven that by a change in the channel pattern or design of the break up, very marked changes occur in the amount of sound which is dissipated or absorbed.

For instance, when the block pattern is changed from one of regular squares to a hexagonal pattern there is a very distinct change in the amount of sound which is dissipated and this is unquestionably due, not to a change in the porosity or flexibility of the material, but entirely to the change in the pattern in which the acoustical elements are arranged, together with the spacing between the units of acoustical material.

Thus, it is possible in the above invention by predetermining the amount of sound which can be dissipated by certain patterns to change and control the sound characteristics in any given room, and from this standpoint the invention opens up entirely new and unexplored fields.

This invention not only involves the sound dissipation that may be effected by mutilation of waves by spaced block formations and arrangements, but also involves the sound dissipation that may be effected by making structures of the above nature and the mounting therefor of materials having porosity, surface friction and flexibility in various ratios and proportions to suit the occasion.

In making this invention, not only has an acoustical structure been produced which effectively dissipates and absorbs all kinds of sound waves, but also a construction has been produced which is durable and adapted to be easily and readily decorated.

Bearing in mind the value of associating the above factors and characteristics in their most effective relation and also the difficulties to be overcome, this invention involves the bringing together of materials that are particularly adapted, forming and associating them into acoustical structures which are most effective in absorbing, dissipating and modulating sound waves.

Referring to the drawings, and first to Fig. 1, the numeral 11 designates the inner member or base of a sound-dissipating material constructed according to this invention, upon which may be mounted in any suitable manner a layer 12 of different material, or similar material, and of the same or different texture. The base 11 may preferably be constructed of a resilient or flexible porous material, such as hair felt or jute felt, asbestos fibre, or a combination of any of the above, depending only upon the manner and place in which the construction is to be mounted and used or the degree of modulation which it is desired to accomplish. The intermediate layer 12 is preferably attached to the base 11 by fabricating thereto or by means of a flexible cement or glue, but may be secured to the base in any preferred manner.

A plurality of sound-absorbing members or filtering and multilating units 13 are mounted upon the intermediate member 12, preferably by a waterproof fire-resisting cement, glue or the like, in spaced relation to each other. The facing members 13 are preferably constructed of a porous material; however, they may be either rigid and dense or flexible and resilient, and may consist of an animal, vegetable or mineral material, or a combination of these elements, depending only upon the result which it is desired to accomplish. It has been found that the spacings 14 between the various facing members 13 are an important and vital factor in controlling the dissipation of the sound waves by mutilation and surface friction, and it is of course understood that these spacings may be increased or decreased, and further that the spacings between the various members of each unit may be equal or unequal, depending only upon the degree of sound wave dissipation or modulation which it is desired to accomplish.

It is a well known fact that practically all, if not all, of the materials now used in prebuilt sound-absorbing or acoustical deadening structures are of an inflammable nature, and for this reason the general use of prebuilt sound-absorbing structures has been somewhat limited, but this built-up system allows for various combinations of units and materials suitable for the occasion where fire hazard is a factor, as well as acoustical difficulties. That is, facing units having fire-resisting and decorating properties may be mounted upon the same kind of material but of a different texture having a greater sound-dissipating or deadening capacity, or said fire-resisting units may be mounted upon a backing of a different material having a maximum sound-absorbing or deadening efficiency, and while its fire-resisting capacity is not as great, the facing units form a sort of protecting surface therefor.

Figure 2:
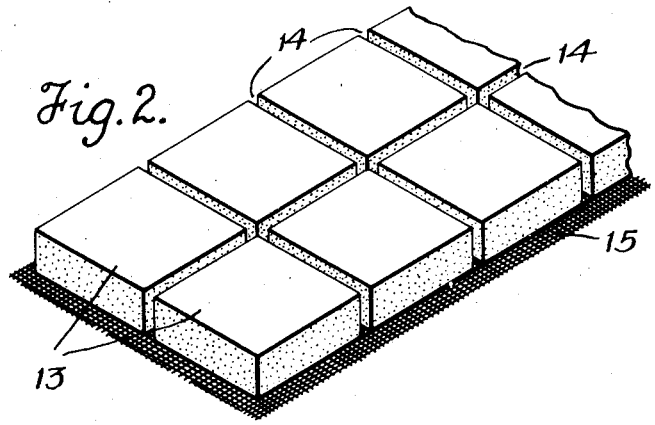
Fig. 2 is a fragmentary detailed perspective view showing a slight modification in the base-supporting means.

Referring to Fig. 2, the outer members 13 are spacedly mounted upon a flexible backing 15, comprising sheets or fabrics made of vegetable fibres, such as jute, or non-inflammable fibres, such as asbestos or the like. The modification shown in Fig. 2 is particularly adapted for structures which are more or less angular, warped or curved, for the reason that it can be easily flexed and readily applied. This construction is of course less expensive to make than the construction shown in Fig. 1, and can therefore be applied where the matter of expense plays a very important part in the use of this material.

Figure 3:
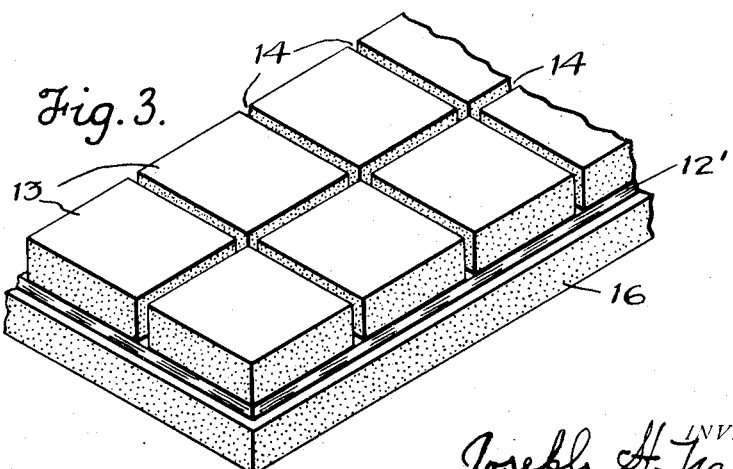
Fig. 3 is a fragmentary detailed perspective view showing an assembly similar to Fig. 1 in which there is an intermediate resilient layer between the surface units and the base member.

Referring now to Fig. 3, the construction herein shown is somewhat similar to that shown in Fig. 1, but differs in that the backing 16 may comprise either a rigid porous material, such as wood or asbestos composition board, or else a rigid non-porous material, such as sheet rock or the like. The intermediate layer 12' consists of a flexible porous thin felt cemented to the backing by means of a waterproof heat-resisting cement.

Figure 4:
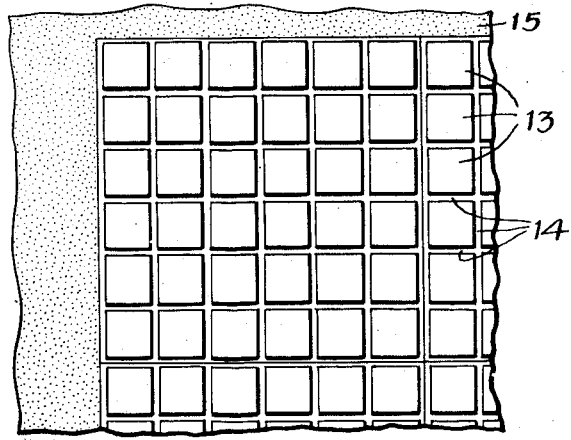
Fig. 4 is a detailed face view showing the application to a wall of a construction having the design or configuration illustrated in Figs. 1, 2 and 3.
Figure 8:
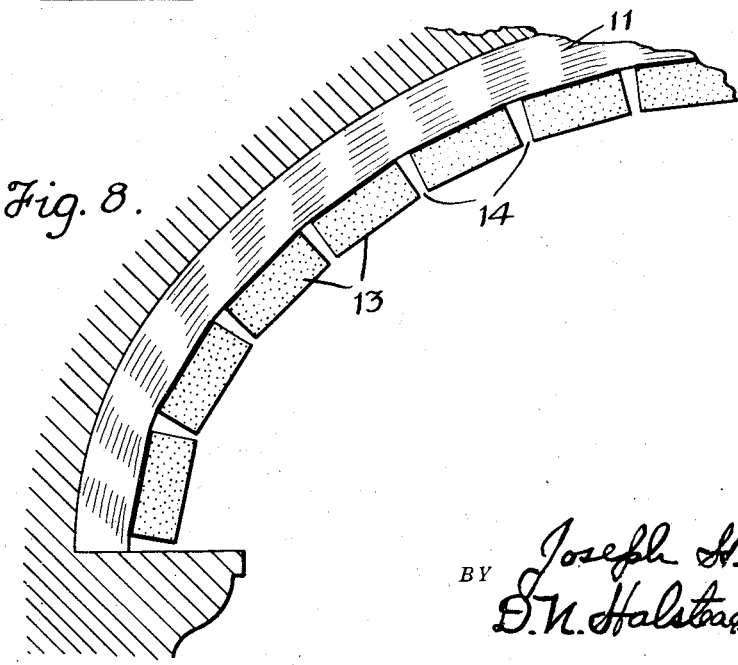
Fig. 8 is a detail transverse section taken longitudinally through a prebuilt unit which is mounted in an archway, which is shown in cross section and partly cut away.

With all the above structures, the base member may be cemented or mechanically attached to a wall, ceiling 15, see Fig. 4, or any other structure forming the framework of a room or building. Fig. 8 shows how one of the flexible modifications allows for application and attaching to any style of architecture, such as archways or the like.

Figure 5:
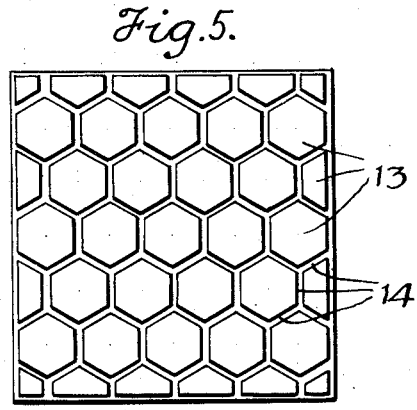
Fig. 5 is a detail face view showing a slight modification in the design or configuration which may be applied or formed on the surface of a wall.
Figure 6:
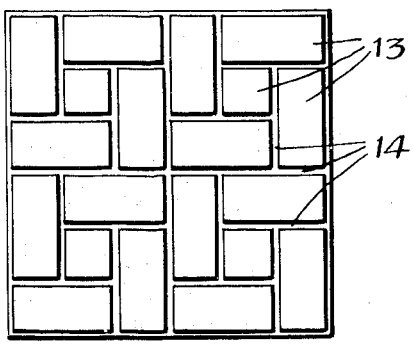
Fig. 6 is a detail face view showing another modification in the design or configuration.
Figure 7:
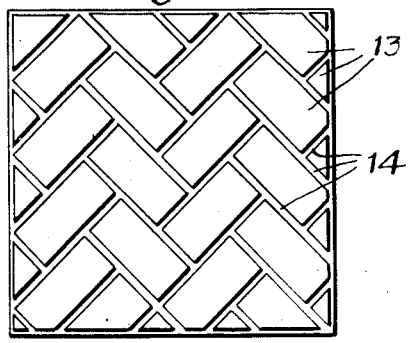
Fig. 7 is a detail face view showing a still further modification in the design or configuration.

In the course of a series of laboratory experiments with the structures herein illustrated, it has been found that by varying the spacings between the outer facing members 13, and by changing the configuration of the members as shown in Figs. 5, 6 and 7, not only will the designs thereof be pleasing to the eye, but each combination will have a different sound-absorbing and dissipating capacity, and by using suitable acoustical instruments it is possible to determine and assemble combinations having configurations and structures which are the most effective for the particular use. As hereinbefore stated, it has been found that there is a very pronounced dissipation of sound waves by block-like surface formation, which, irrespective of the character of the material used, is effective and varies with different sized blocks, with different thicknesses, with different spacings and with different shapes and patterns. By this invention, bearing in mind these factors, the surfaces of a wall or ceiling can be formed with block-like formations which have any desired sound dissipations suitable for the occasion. This may be done on the job by suitably shaping or forming the surface of the plastic or moulding material used in building construction. Preferably, the structure is prebuilt in units shaped according to certain patterns which have known sound-dissipating capacities and then applied on the job.

In Figs. 6 and 7, certain of the block-like members have a facing surface rectangular in outline. In these modifications as well as the other illustrated embodiments, it is to be noted that the minimum dimension of the facing surface of the individual blocklike member is at least several times greater than the width of the channel defined by the adjacently spaced members. These relative dimensions are prefered as the continuity of the finished surface is preserved to a greater degree.

It is, of course, understood that the thickness of the base members, the intermediate cushion layers when used, and the outer facing members may be varied to meet the particular exigency, and that the thicknesses of each member may be equal or unequal depending upon the result which it is desired to accomplish. The surfaces of the facing members are so constructed and finished that they can be coated with paint, dyes, lacquers or ground slate, mineral or ceramics, as may be desired for the purpose of decoration.

It is further understood that various changes and modifications may be made in the details of construction and design of the above specifically described embodiments of the invention without departing from the spirit thereof, such changes and modifications being restricted only by the scope of the following claims.

What I claim is:

1. A construction for dissipating and modulating sound waves, comprising a base member and block-like members mounted thereon in spaced relation so as to provide intersecting channels there-between.

2. A construction for dissipating and modulating sound vibrations, comprising a base member and porous block-like members mounted thereon in spaced relation so as to provide intersecting channels there-between.

3. In an acoustical construction comprising base members, block-like members mounted thereon spaced so as to provide channels therebetween, an intermediate layer of porous material between the base and block members.

4. In an acoustical construction, a base member, porous members mounted thereon spaced so as to provide channels therebetween, an intermediate layer of fibrous material between the base and the porous members.

5. In an acoustical construction, a base member, block-like members mounted thereon in a spaced relation so as to provide channels therebetween, an intermediate layer of resilient material between the base member and the block-like member.

6. A construction for dissipating and modulating sound vibrations, comprising a base member and porous sound absorbing block-like members mounted thereon in spaced relation so as to provide intersecting channels there-between, the minimum dimension of the facing surface of the individual block-like members being at least several times greater than the width of the channel defined by the adjacently spaced block-like members.

7. A construction for dissipating and modulating sound vibrations, comprising a base member and porous sound absorbing block-like members adhesively mounted thereon in spaced relation so as to provide intersecting channels there-between, the minimum dimension of the facing surface of the individual block-like members being at least several times greater than the width of the channel defined by the adjacent spaced block-like members.

Signed at New York in the county of New York and State of New York this 10th day of October A. D. 1928.

JOSEPH H. NASH.